United States Patent
Glushnev et al.

(10) Patent No.: US 7,222,067 B2
(45) Date of Patent: May 22, 2007

(54) FINITE STATE DICTIONARY AND METHOD OF PRODUCTION THEREOF

(75) Inventors: Nikolay Glushnev, Dublin (IE); Seppo J. Koskenniemi, Helsinki (FI); Alexander V. Troussov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 925 days.

(21) Appl. No.: 10/278,404

(22) Filed: Oct. 23, 2002

(65) Prior Publication Data
US 2003/0135361 A1 Jul. 17, 2003

(30) Foreign Application Priority Data
Jan. 9, 2002 (GB) .................... 0200352.3

(51) Int. Cl.
*G06F 17/21* (2006.01)
(52) U.S. Cl. .................... 704/10; 704/1; 704/9
(58) Field of Classification Search ........... 704/1, 704/9, 10
See application file for complete search history.

(56) References Cited

U.S. PATENT DOCUMENTS

| | | | | |
|---|---|---|---|---|
| 4,241,402 A | * | 12/1980 | Mayper et al. ........... | 707/6 |
| 5,642,522 A | * | 6/1997 | Zaenen et al. ........... | 715/532 |
| 5,651,099 A | * | 7/1997 | Konsella ................... | 706/13 |
| 5,669,007 A | * | 9/1997 | Tateishi ................... | 715/517 |
| 6,169,999 B1 | * | 1/2001 | Kanno ..................... | 715/532 |
| 6,298,321 B1 | * | 10/2001 | Karlov et al. ........... | 704/10 |
| 6,965,861 B1 | * | 11/2005 | Dailey et al. ........... | 704/242 |

* cited by examiner

*Primary Examiner*—Richemond Dorvil
*Assistant Examiner*—Leonard Saint-Cyr
(74) *Attorney, Agent, or Firm*—Akerman Senterfitt

(57) ABSTRACT

A finite state dictionary (200, 780) and method of production thereof by providing nodes (210–240) representing symbols stored in the dictionary; providing links (250–290) linking predetermined nodes; classifying each of the nodes; and associating with each node one of a plurality of formats selected in dependence on the node's classification. The node's classification is preferably representative of the node's probability of use. The plurality of predetermined formats preferably comprises: start of chain (210); heavy use (230); middle use (220); and light use (240). The probability of use of the nodes may be determined from a predetermined symbol probability analysis, or from a prior accumulation of statistics from use with corpora. This produces the advantage of increased run-time speed of dictionary look-up, and may reduce the dictionary's size.

22 Claims, 4 Drawing Sheets

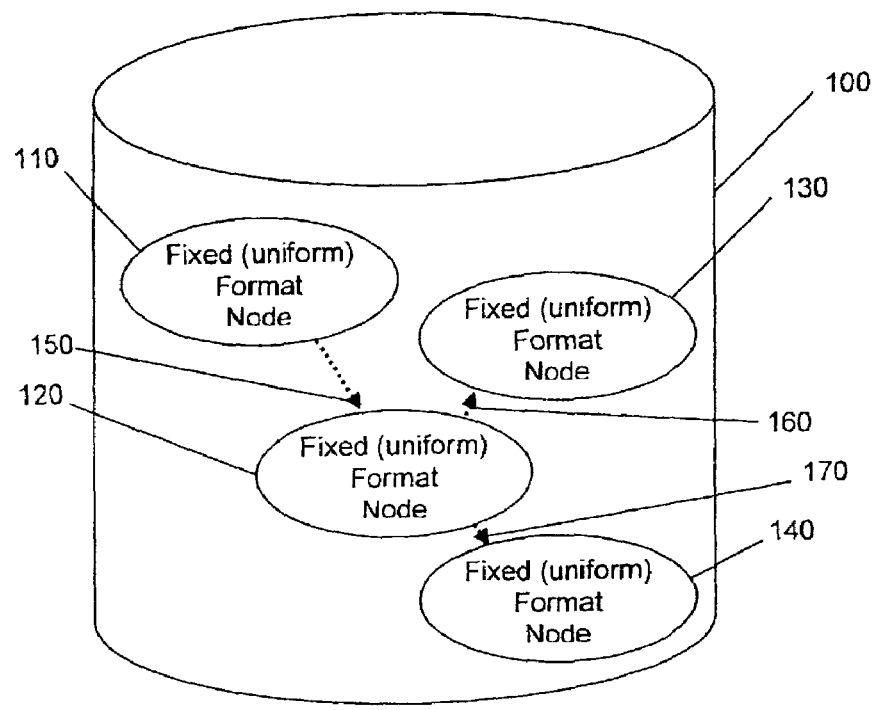
**FIG. 1
Prior Art**
FIG. 2
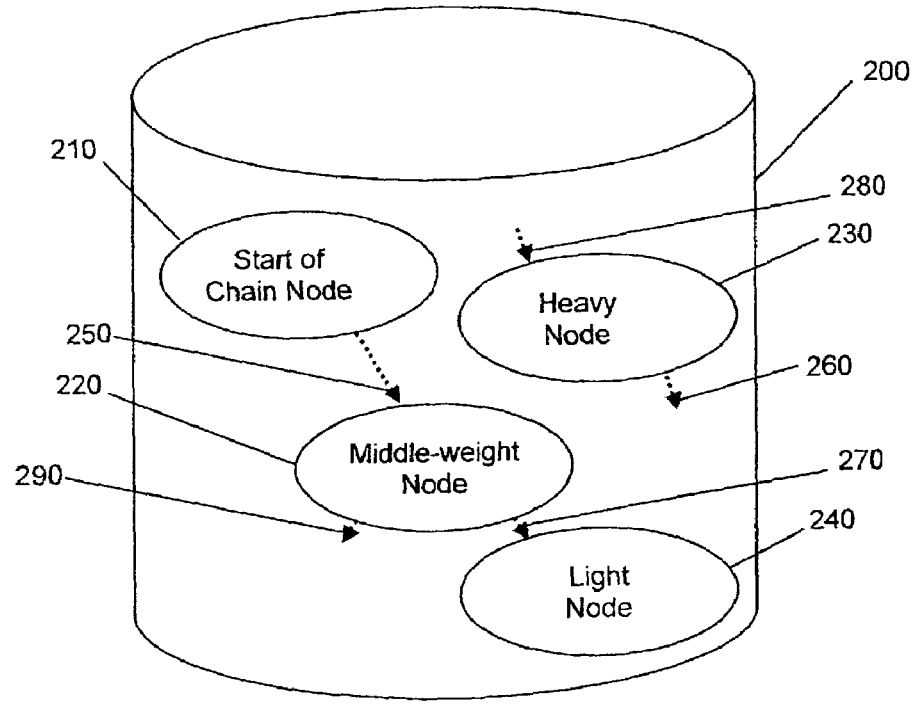

*Chain format with out-flowing arc labelled by the string "strial"*

US 7,222,067 B2

FINITE STATE DICTIONARY AND METHOD OF PRODUCTION THEREOF

CROSS REFERENCE TO RELATED APPLICATIONS

This application claims the benefit of United Kingdom Patent Application No. 0200352.3, filed Jan. 9, 2002.

BACKGROUND OF THE INVENTION

1. Technical Field

This invention relates to finite state dictionaries, and particularly, though not exclusively, to electronic linguistic dictionaries for use in data processing.

2. Description of the Related Art

Finite state processing is the technology which dominates in the field of linguistics products related to dictionary look-up.

Finite state processing in application to natural and artificial (computer) languages processing appeared almost fifty years ago. Twenty years ago finite state processing had its rebirth in applications to natural language processing; during the last decade it has become by and large an industry standard for dictionary look-up. The main efforts in this field were concentrated on designing more and more complicated finite state nets for solving of specific problems, and on reducing the number of states in these nets to overcome the main inherited problem of the finite state processing approach—the prohibitively large amount of required memory. The gain in speed provided by this approach per se, combined with the steady increase of computer performance was sufficient for spell checking, hyphenation, and other linguistic applications, typical for word processors. Optimization of finite state nets for speed was considered only at the macro level of the topology of the nets.

Finite state processing involves computer representation of a 'net' made up of nodes and links between these nodes, also known as states and transitions. Current known dictionary tools use some predefined fixed format for representation of nodes and links. The oldest and most well-known of such methods is called TRIE structure (taken from the term 'reTRIEving'). This method provides fast run-time access, but requires considerable memory and therefore is not typically used for processing of natural languages.

The rise of text data mining and knowledge management, which to some extent was instigated by the pervasive spread of Internet/intranet technologies, makes new demands on the speed of text processing; these applications require high speed for tokenization, producing morphological identification, lemmatisation, and key word extraction.

A need therefore exists for a finite state dictionary and method of production thereof wherein the abovementioned disadvantage(s) may be alleviated.

SUMMARY OF THE INVENTION

In accordance with a first aspect of the present invention there is provided a finite state dictionary as claimed in claim 1.

In accordance with a second aspect of the present invention there is provided a method of producing a finite state dictionary as claimed in claim 12.

BRIEF DESCRIPTION OF THE DRAWINGS

One method and arrangement for a finite state dictionary incorporating the present invention will now be described, by way of example only, with reference to the accompanying drawing(s), in which:

FIG. 1 shows a schematic representation of a finite state dictionary having a number of nodes, each with the same fixed format, as known in the prior art;

FIG. 2 shows a schematic representation of a finite state dictionary having a number of nodes, with differing formats, incorporating the present invention;

DESCRIPTION OF THE INVENTION

Figure 3:
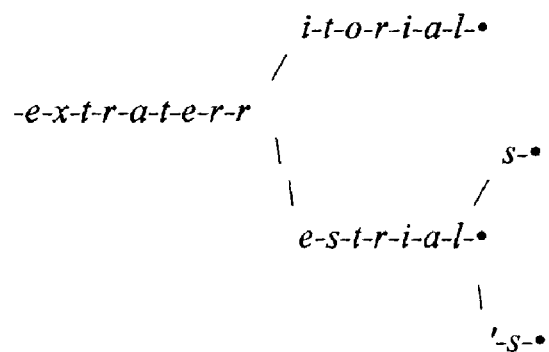
FIG. 3, FIG. 4, and FIG. 5 show illustrations of nodes and links useful in understanding the dictionary of FIG. 2.

The most well-known format for the representation of finite state automata is so-called TRIE format, well-described by Donald Knuth in his multi-volume series of books entitled "The Art of Computer Programming". This format provides high speed of access, but is not suitable for handling large dictionaries. "Large" dictionaries, used for natural language processing, can contain millions of lexical entries. The best-known paradigm, which is commonly called 'directed acyclic word graph' (DAWG), for handling such dictionaries can be described by the following scheme:

The net is represented by its set of nodes. Each node has the following memory representation (both on abstract and physical levels):

$$\text{node\_header link}_1 \text{ link}_2 \text{ link}_3 \ldots \text{link}_n$$

where node-header contains some information about the node (e.g., if the node represents final state), and $\text{link}_1 \ldots \text{link}_n$ represent possible transitions (commonly termed 'arcs' or 'links') to other nodes. To represent a link one needs the character, which is the condition of the transition, and the pointer to the next node. This format was used, for example, in the known 'INTEX' linguistic development system.

TRIE structure allows one to calculate an index in each node based on the input character, this index is used for finding the corresponding link. In INTEX-style dictionaries, one needs to sequentially search through the set of links $\text{link}_1, \text{link}_2 \ldots$ to find the required link; but unlike the TRIE format, this format is space conservative—it isn't necessary to store an array of pointers with dimensionality equal to the number of characters used in the dictionary.

An FSA (Finite Stace Automata) dictionary can be considered as a directed graph; in graph theory the number of arcs out of a node v is called the out-degree of v. Usage of TRIE structure doesn't produce much memory overhead if an average out-degree of the nodes is close to the number of characters used in the dictionary (however, this is not the case for dictionaries used in Natural Language Processing—NLP).

An analogy can be traced between the two above-mentioned approaches and the technique for storing graphs. A full graph can be represented by an incidence matrix or adjacency matrix, while a "sparse" graph requires the application of the techniques for storing a sparse matrix, where the array of pointers (as used in TRIE) is replaced by the list of pointers, thus disallowing index usage. Both of these approaches, which also represent polar paradigms, use some fixed format for all nodes. Each node is assigned the same fixed format; hence the node format doesn't take into account either graph topology, or the statistics of the usage of a specific node. Such a prior art finite state dictionary is shown in FIG. 1, in which dictionary 100 comprises a net having fixed (uniform) format nodes (only four of which, 110, 120, 130 and 140, are shown) and links or arcs (only three of which, 150, 160 and 170, are shown).

The present invention is based upon the realization by the inventor(s) that use of variable node formats allows an increase in speed of dictionary access. As shown in the example of FIG. 2, a finite state linguistic dictionary 200 incorporating the invention comprises a net having nodes (only four of which, 210, 220, 230 and 240, are shown) and links or arcs (only three of which, 250, 260, 270 and 280, are shown); as will be explained in more detail below, the nodes of the dictionary 200 have differing formats, allowing increased speed of dictionary access.

As usual, it is expected that there is some trade-off between speed of access and memory used. Enlargement of the memory can lead to increasing of the access speed, but in commercial systems there are some limitations to the memory used, and these limitations can vary for different applications of the same base product.

The inventors of the present invention have proposed "cross-breeding" of the above mentioned formats, so that the fast access of the TRIE approach will be combined with low memory requirements of INTEX style formats. No attempts at such "cross-breeding" have been implemented to the present invention, as far as is known by the present inventors.

A systematic approach to implementing the present invention includes the following steps:
 sound classification of nodes, which leads to format design;
 describing and refining of the possible formats and access codes; and
 implementation of the procedure of choosing node format.

The performance of a dictionary depends on the texts processed. In the context of natural languages, it is well known that the distribution of words in natural languages is not uniform, e.g., one hundred of the most frequent English words covers more than half of the words in typical texts. Zipf's law, which describes this distribution, fits well with empirical data. It can be expected, based at least on empirical observations, that the usage of a finite state dictionary's nodes in the processing of real text follows a similar distribution. The broad question, concerning dictionary vs. texts, of whether the dictionary can be optimized based on the structure of the dictionary itself, or whether reliance should be placed on the statistical properties of corpora, is outside the scope of this description, but the present invention allows both of these paradigms to be taken into account.

A first implementation of the present invention is based on imposing the structure of a Markov chain on a directed acyclic word graph (a Markov chain being a finite state machine with probabilities for each transition, i.e., probability that the next state is $s_j$, given that the current state is $s_i$). Probabilities can be assigned by studying graph metrics based on ad hoc assumptions, or by direct experiments with corpora.

Nodes Classification

A first step of the preferred implementation of the present invention is based on classification of nodes. Generally speaking, the classification can be based on the statistics of the usage of nodes (especially assuming Markovian property) and the topology of the net itself (graph metrics). In other words all nodes can be classified according to the following two criteria: the usage (how often the node is visited during the corpora processing), and, e.g., how many in-flowing and out-flowing links this node has (in-degree and out-degree of the node). Both of these criteria can be used for assigning the format to the node. However, the correlation between these two criteria is high, and instead of the two-dimensional taxonomy the present example uses a one-parametric, unified, empirically-grounded classification. It is believed that for the practical goal of prescribing formats and access codes, more detailed taxonomy will not lead to significantly better results in terms of the size of the dictionary and average run-time performance. Correspondingly, the following classification is used, as shown in table 1:

TABLE I

One-parametric classification of finite state dictionary nodes according to the frequency of their usage during corpora processing and out-degree of the node.
Classification of finite state dictionary nodes from "light" modes to "heavy" nodes

| Node's class description | Start of chain (e.g., node 210 of FIG. 2); Chain is formed from nodes with only one out-flowing link, which leads to another node with only one out-flowing link. The first node in such chain is referred to as start of chain. | "Light" node (e.g., node 240 of FIG 2): Typical nodes with more than one out-flowing link. | "Middle weight," node (e.g., node 220 of FIG. 2): Nodes with a dozen or more of out-flowing links, not classified as "heavy" nodes. | "Heavy" node (e.g., node 230 of FIG. 2): Often visited nodes, they typically have large numbers of out-flowing links. |
|---|---|---|---|---|
| Preferred format and technique for searching of | If there is the path containing more than one node with out-degree | Links are stored in the list of the out-flowing links, | Links are stored in the list of out-flowing | Links are stored in the array with dimensionality |

TABLE I-continued

One-parametric classification of finite state dictionary nodes according to the frequency of their usage during corpora processing and out-degree of the node.
Classification of finite state dictionary nodes from "light" modes to "heavy" nodes

| required out-flowing link: | equal to one, the information about intermediate nodes can be implicity stored at the start of the chain to provide fast-track from the first node in chain to the last one. | they are reordered according to the frequency of their usage. Linear search is used for finding required out-flowing link. | transitions. Logarithmic search is used for finding required out-flowing link. This format is used instead of the format of "Heavy nodes" when memory size is of concern. | equal to the number of characters presented in the dictionary. Indexing by characters leads to constant time search. |
|---|---|---|---|---|

Formats and Access Code

Assigning of the formats and access code to the nodes is based on the classification provided by the above Table I. A detailed description of the formats and access code to the nodes is given below, but this is preceded by the following short overview.

General Considerations

The most often visited nodes are provided with transition tables, described in Knuth as TRIE methodology. This accounts for a significant portion of the acceleration of run-time dictionary access; but this method is memory expensive, which imposes limitations on its usage.

The out-degree of other nodes is typically less than 10; in such a situation a linear search is more efficient than a logarithmic one. It is expected that rearrangement of out-flowing links according to the frequency of their usage will ensure very high performance combined with simple access code-sequential search. For the nodes with bigger out-degree, logarithmic search can be used.

A significant part of the dictionary is comprised from what may be called "letter chains", when the out-degree of several consecutive nodes is equal to one. This is true for any natural language dictionary, and the importance of this method increases for dictionaries containing proper names, abbreviations and multiword expressions. Faster access can be provided for a letter's chain from the first node of the chain to the last node without specifying the pointers to intermediate nodes: only characters representing transitions must be stored. Introduction of special formats for letter chains is space-efficient and also indirectly increases performance.

A more detailed description of the dictionary nodes classified in Table I follows:

Heavy Nodes

According to the above classification, "heavy" nodes are the most often visited nodes; they can be usually associated with the bounds of the most-used morphemes (graphemes), so that their valency (which is the sum of out-degree and in-degree) is high. An example of such a node could be, in English, the prefix "re-", after which any character can be expected.

To such a node is assigned a format, which includes a transition table (not shown) such as known from the Knuth publication referred to above, allowing indexing.

Although such an implementation appears not to deviate significantly from those described above (e.g., from the Knuth publication referred to above), in the present example the assigning of this format is done not indiscriminately to each node of the net (as in Knuth), but deliberately to "heavy nodes" based on statistics of corpora processing.

Interestingly, results of experiments suggest that indiscriminate usage of this format for all nodes may even degrade performance.

Middle Weight Nodes

In the creation of the dictionary one can encounter nodes where the number of out-flowing links (out-degree) is high, but the nodes are not very often visited; in these cases one can decide not to use "heavy node" format, so as not to increase the dictionary size.

Theoretically speaking, logarithmic search can be used for these nodes; but experiments with Indo-European languages indicated that it may not be necessary to implement this search methodology for the following reasons:

The following analysis attempts to estimate how frequent are such cases, how they can affect the average performance, and how they can be treated to improve the performance, and whether there really can be considered an area in-between "heavy" nodes and "light" nodes (discussed below), which requires special treatment.

Binary search or any other logarithmic searching can be more efficient than linear searching only if the number of searched items is large enough, typically over 10. Most of the nodes in dictionaries considered in this example will contain much lesser numbers of links than 10, (as an upper bound, the number of links is certainly not more than the number of all characters in the alphabet used for dictionary representation). Moreover, the superiority of binary searching holds true only if the distribution of probabilities of searched items is close to the uniform, which is not the case for natural languages, where there is a strong pair-association between adjacent letters. In such cases simple rearrangement of searched items according to their probabilities will ensure better performance, simply because several top "popular" links will cover most cases, and will be responsible for most of the traffic. Taking into account the fact of uneven distribution of probabilities, the theoretically chosen rule-of-thumb number 10 is increased in the estimation for this example to 20.

CONCLUSIONS

The above-mentioned preliminary considerations indicate that the number of nodes with high out-degree is relatively small; these nodes are probably the most often visited nodes, so they can be better treated by TRIE methodology (transition tables). However, if the coding of the dictionary is not a letter coding as in the presently considered example, (e.g., instead, morphic coding), logarithmic searching can be useful (in morphic coding some substrings are encoded with new characters, like a simplified Huffman encoding).

Light Nodes

Memory representation of these nodes uses the same basic, known structure which is used in INTEX style dictionaries:

node_header link$_1$ link$_2$ link$_3$ . . . link$_n$

The access code uses linear search. However, the order of the links, which is critical for the speed of the search, is not superficial, like following alphabetical order of transition's characters, but is chosen according to the probabilities of links' occurrence in corpora processing:

node_header most often used link . . . least often used link

Links reordering can be better done based on corpus statistics of each link usage. Results of experiments, indicate that more easily calculated character frequency can be successfully used:

| node_header | link$_1$ | link$_2$ | . . . link$_n$ |
|---|---|---|---|
| | labeled by Char$_1$ | labeled by Char$_2$ | labeled by Char$_n$ | where frequency of Char$_1$ is greater than or equal to the frequency of Char$_{i+1}$, for i=1, 2, . . . , n−1.

Within the knowledge of the inventor(s), such facilitation of linear search has not been used in dictionaries exploiting finite state processing techniques.

Start of Chain Nodes

As mentioned above, a significant part of the dictionary is comprised from "letter chains", where the out-degree of several consecutive nodes is equal to one. This is true for any natural language dictionary, and the importance of this method increases for dictionaries containing proper names, abbreviations, and multiword expressions. For a letter's chain, faster access can be provided from the first node of the chain to the last node of the chain without specifying the pointers to intermediate nodes; only characters representing transition must be stored. Moreover, after this operation all intermediate nodes with in-degree equal to zero can he eliminated. In other words, a 'child', of a 'start of the chain' node is merged with its parent and the arc's labels are concatenated; the same operation is applied for the child of the child, etc., until a node is encountered with more than one child. Introducing special formats for letter's chains is space-efficient and also may increase performance in some cases.

The following example illustrates how this method works for the word "extraterrestrial" during its look-up in a finite state dictionary. After proceeding -e-x-t-r-a-t-e-r-r- the look-up encounters a node which has exactly two out-flowing arcs, labeled by letters 'i' and 'e', following which can be recognized the surface forms: extraterrestrial, extraterrestrial's, extraterrestrals, extraterritorial. The node structure can be illustrated as shown in FIG. 3, where characters (e.g., -s-) label arcs, and the symbol • denotes final state (non-terminal nodes not being shown). As usual, coming to a final state during dictionary look-up indicates that the surface form is recognized as orthographically correct. It will be appreciated that final states can also hold glosses.

Figure 4:
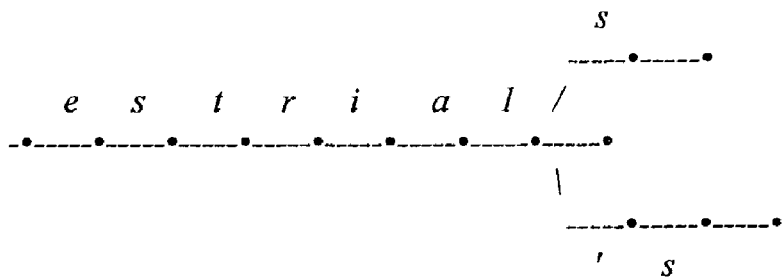

An analysis of the finite state dictionary shows that there is only one out-flowing transition from the node extraterre, and this transition must go to the node extraterrestrial. FIG. 4 shows both transitions and nodes following extraterrestrial.

By assigning the format "start of a chain" to the first node on the above scheme as shown in FIG. 4, fast track access can be provided from this node to the destination node.

Figure 5:
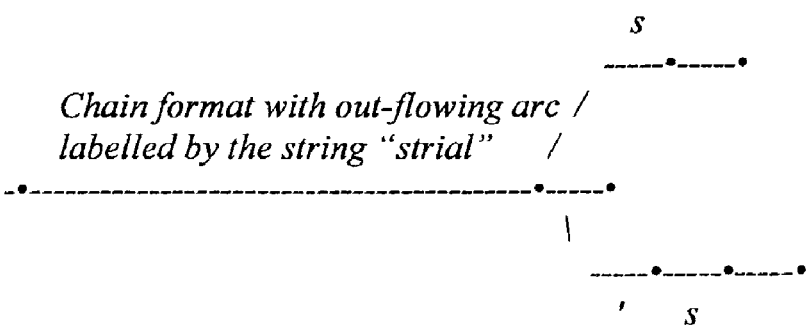

As shown in FIG. 5, the node with chain format has only one out-flowing link. This link may be considered as labeled not by a single character, as for "usual" links, but by a substring ("estrial" in this case). In "usual" links the transition is made if the input character matches against the symbol attributed to the link. In chain format the transition is made if the substring from the input word coincides with the string attributed to the link.

If the dictionary search comes to the node with the format "start of a chain", as in the case of analyzing the first ten letters of the word "extraterrestrial", then the rest of the word is checked against the string attributed to the link ("strial" in this case). If this comparison fails, the search can be stopped because the input word is not a dictionary word. If comparison succeeds, then the transition using the link is made.

Although this method of compression known in the construction of word graphs as a compression algorithm, and the resulting directed acyclic graph (DAG) is called Compact DAG, within the knowledge of the inventor(s), this approach has not been used nor suggested in the context of finite state transducers.

Procedure of Format Assigning

A procedure of assigning of formats to the nodes of finite state dictionary is used, based on each node's classification as described earlier.

A node's degree, which is the sum of in-degree and out-degree, is used for classification in a particular example as follows:

nodes with out-degree close to the number of symbols used in the dictionary can be classified as "heavy" nodes;

nodes with out-degree equal to one are classified as chain, if the link leads to a node with out-degree also equal to one;

all other nodes are classified as "light", the order of links can be established based on the sum of in-degree and out-degrees of the destination nodes (in this particular example of an English natural language dictionary, middle-weight format is considered not useful because memory requirements are not restrictive, and many heavy nodes are used).

In natural text processing the statistics of the dictionary itself reflect statistics of the language, and thus reflect statistics of the usage of the dictionary for text processing. Nevertheless, statistics of the usage of nodes and links, when the dictionary is used to process a corpus of text, produce better classification of nodes and arcs to achieve better run-time characteristics. This is the preferred method for classifying a dictionary in accordance with the present invention, and its main stages are described as follows (referring now to FIG. 6 and FIG. 7):

The input list of words (surface forms)—with glosses—is compiled into a letter tree which is then minimized. By default each node is provided with the format for light nodes; no permutation of links is done. This initial finite state dictionary, shown as 610 in FIG. 6, represents a directed acyclic graph (DAG), which can be used by dictionary look-up code; however, it is here used only for collecting statistics, which will enable the creation of another dictionary with better run-time characteristics.

Figure 6:
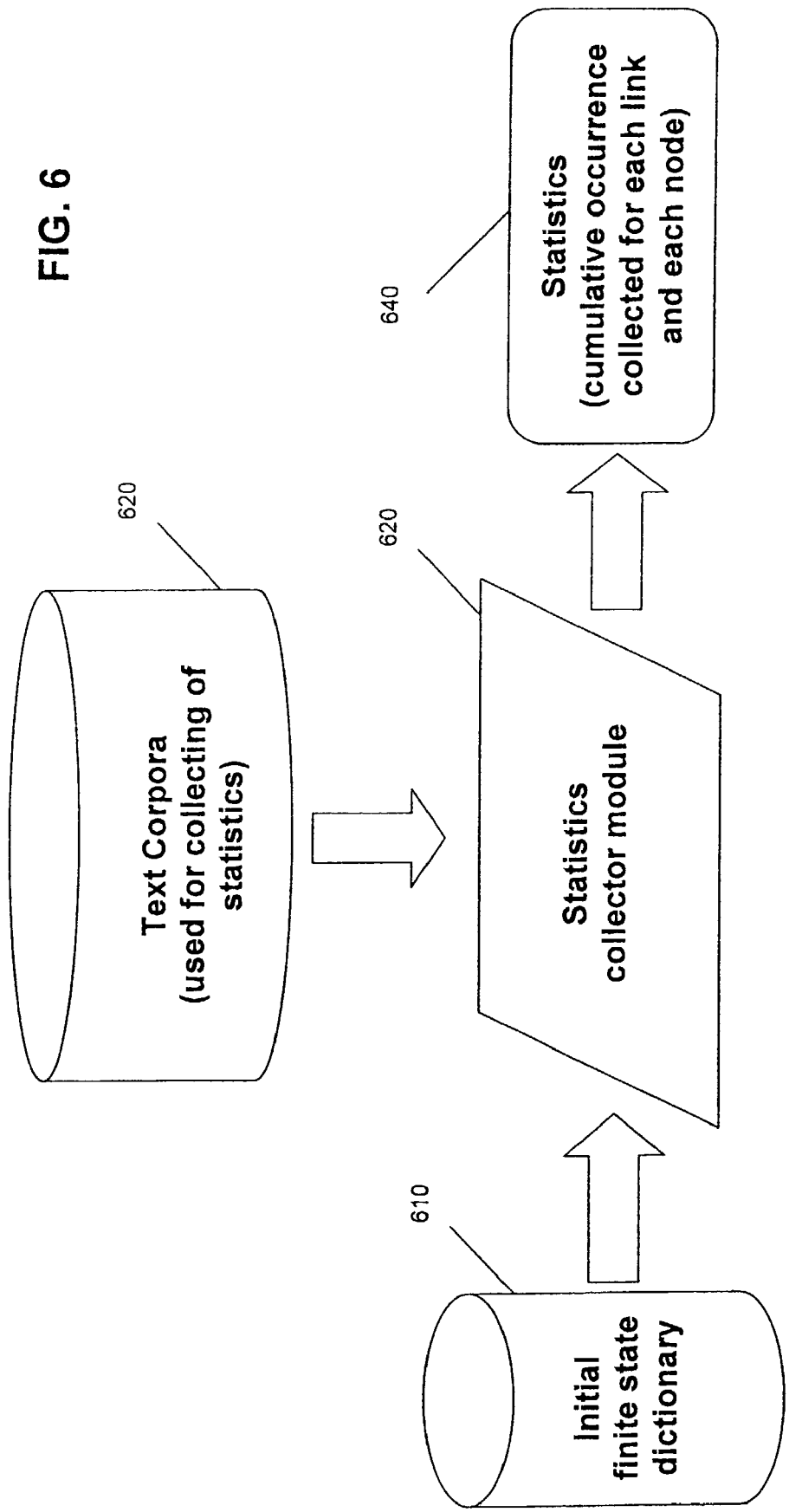
FIG. 6 shows a block schematic diagram illustrating collection of statistics used in dictionary construction in accordance with the invention.

The dictionary is used for processing text corpora, shown as 620 in FIG. 6. For each node and each link a statistics collector module 630 collects the cumulative results of their occurrences. These occurrences are accumulated (as shown at 640 in FIG. 6) for later use, as will be discussed below, for nodes' classification.

Figure 7:
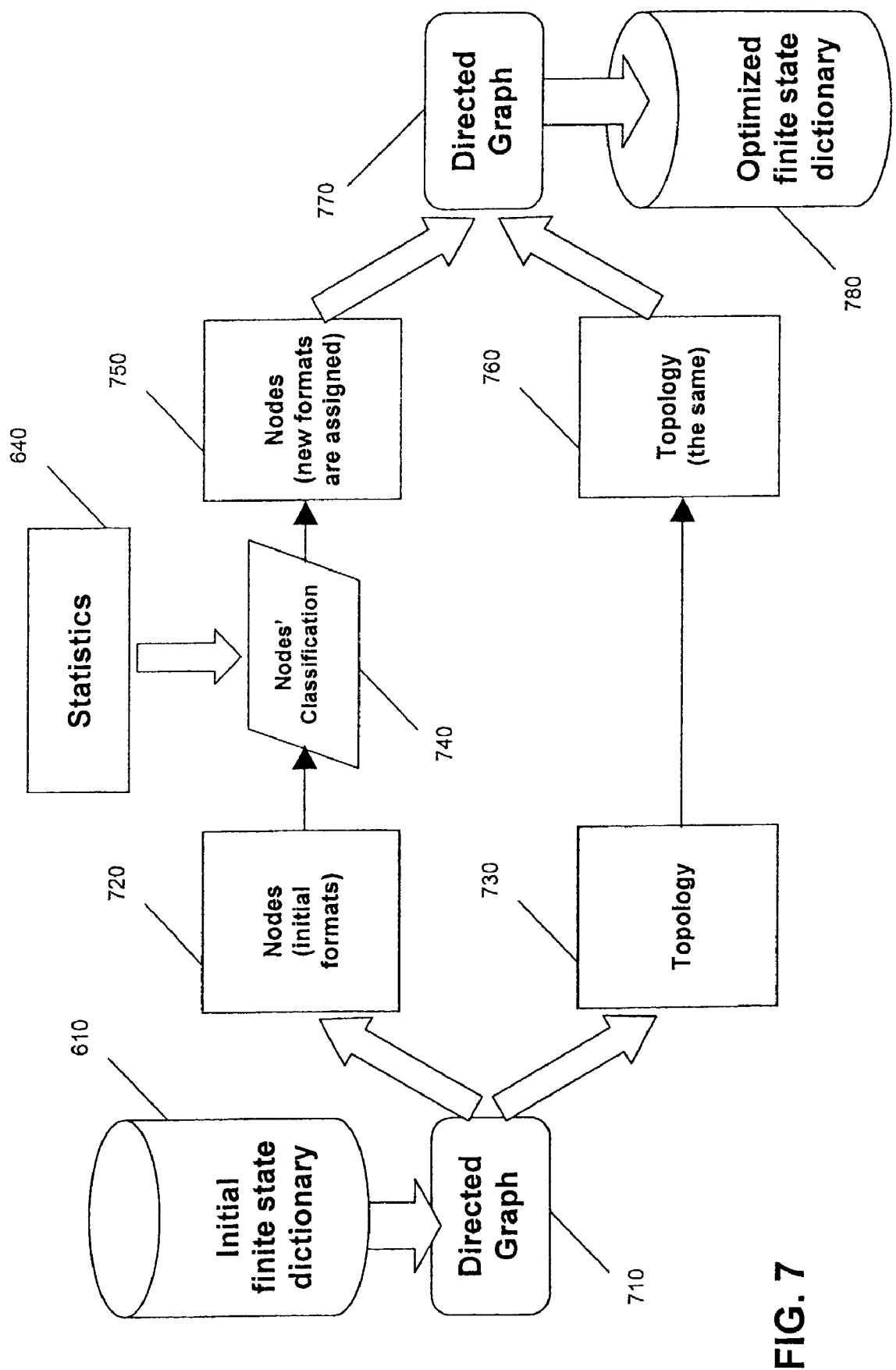
FIG. 7 shows a block schematic diagram illustrating dictionary construction using the statistics collection shown in FIG. 6.

The statistics collected at the previous stage are examined to classify nodes, as shown at 740 in FIG. 7. Nodes classification is done in three steps. Firstly, detection of letter chains is performed. Secondly, the top N often visited nodes are classified as heavy nodes, where N is a positive integer representing an arbitrary chosen threshold. All other nodes are classified as light nodes (as mentioned before, middle-weight format is considered not useful for the purposes of this particular example of an English natural language dictionary, if memory requirements are not restrictive, and many heavy nodes are used).

A virtual replica of the initial DAG is created, as shown at 710. The newly created virtual replica 710 has initial node formats 720 and a topology 730. The topology 730 of the newly created DAG for the dictionary will not be changed during its processing, but the formats of the nodes, and hence memory representation of the graph, will be eventually different. Nodes, classified as heavy, light and chain start are assigned corresponding formats (as shown at 750 in FIG. 7). Nodes which are located between starting and destination nodes of a chain are excluded, if they are not referenced by other nodes.

The memory representation of the graph, created at the previous stage, is compiled (through DAG 770) into the optimized finite state dictionary 780. This dictionary has the same topology (760) as that (730) of the initial dictionary created on stage 1, but has different node formats. This dictionary (780) is used for the release version instead of the first compiled version (which is used only for collection of statistics).

Confirmation of the benefit of this approach has been obtained by its application to a variety of dictionaries and linguistic tools. The main applications of this approach are considered to be:

producing morphological information for dictionaries in English, French and German; and decomposition of solid compounds in German.

Following this approach, and after only elementary subsequent tuning of the dictionary, test results show an increase of up to two times in speed of dictionary look-up.

Experiments with an English language finite state dictionary encoded in UTF16, built with and without use of the variety of node formats as described above, demonstrated the effects of: transition tables; links reordering based on the corpora statistics; links reordering based on the alphabetical statistics; and chain format.

About 1 MB of text were used to create individualized statistics of link's usage for each dictionary node (in practice, usage of bigger corpora is preferable).

The interpretation of these test results produced the following results:

Transition tables and links reordering based on small corpora statistics give more than 50% speed increase;

Usage of some number or transition tables (TRIE structures) improves performance; but "over-usage" may degrade performance;

Transition tables provide slightly more contribution to improved performance than links reordering;

Links reordering, even based only on alphabetical statistics, provides 18% speed increase;

Usage of alphabet statistics instead of corpus statistics for links reordering is also effective;

Usage of chain format doesn't significantly affect the speed of access, but reduces dictionary size.

In conclusion, the approach described above provides the following distinct characteristics:

systematic approach to the problem of node formats and access code algorithms based on original node's classification;

variable node formats and access codes, which include previously used formats;

new node format previously not used in finite state dictionaries (links reordering); and statistics-based procedure of assigning node formats, which allows building of domain-specific dictionaries according to desired trade-off between speed and size.

This produces the advantage of increased run-time speed of dictionary look-up.

What is claimed is:

1. A finite state dictionary for use in data processing, the dictionary comprising:

nodes representing symbols stored in the dictionary and having a node classification, the classification being one selected from a group comprising: start of chain, heavy use, middle use, and light use; and links linking the nodes, each of the nodes having associated therewith one of a plurality of different predetermined formats selected in dependence on the node's classification, wherein a plurality of different formats are useable simultaneously to represent respective ones of said nodes and/or links in the dictionary, wherein classification of each node is based on a probability of use of the node, and the format of the node in view of the node's classification assigns a searching strategy for accessing the symbols in the dictionary.

2. The finite state dictionary of claim 1, wherein the node's classification assigns the format based on the node's probability of use and an in-degree and an out-degree of the node, wherein the in-degree identifies a first number of in-flowing links and the out-degree identifies a second number of out-flowing links.

3. The finite state dictionary of claim 2, wherein the plurality of predetermined formats comprises a different format for at least two of:

start of chain nodes, comprising nodes having only one out-flowing link to another node having only one out-flowing link;

heavy use nodes, comprising nodes having more than a first predetermined number of out-flowing links;

middle use nodes, comprising nodes having a number of out-flowing links less than or equal to the first predetermined number and greater than a second predetermined number which is less than the first predetermined number; and light use nodes, comprising nodes having more than one out-flowing link and which is not a heavy use node or a middle use node.

4. The finite state dictionary of claim 3, wherein the format for heavy use nodes comprises a transition table identifying links between symbols in the dictionary and an indexed array into the transition table for holding links out-flowing from the associated node, wherein the searching strategy associated with the format for heavy use nodes uses the index array to retrieve symbols from the dictionary, and the symbols are ordered by probability of use in the indexed array.

5. The finite state dictionary of claim 3, wherein the format for middle use nodes comprises an array holding links out-flowing from the associated node, wherein the searching strategy associated with the format of middle use nodes uses logarithmic indexing in a linked node list for finding the out-flowing link.

6. The finite state dictionary of claim 3, wherein the format for light use nodes comprises an array holding links out-flowing from the associated node, the links in the array being ordered according to their probability of use, wherein the searching strategy associated with the format of light use nodes uses linear indexing in a linked node list for finding the out-flowing link.

7. The finite state dictionary of claim 3, wherein the format for start of chain nodes comprises means for holding, if the associated node is linked to a sequence of more than two nodes each having only one out-flowing link, a pointer to the last node in the sequence and for holding the or each symbol associated with further nodes in the sequence as a letter chain comprising a string of characters, wherein during searching for a symbol in the dictionary, a transition is made to the start of chain nodes only when a substring from an input word matches the letter chain attributed to the link created by the pointer.

8. The finite state dictionary of claim 2, wherein the probability of use of the nodes is determined from a predetermined symbol probability analysis.

9. The finite state dictionary of claim 2, wherein the probability of use of the nodes is determined from a prior accumulation of statistics from use with corpora.

10. The finite state dictionary of claim 1, wherein the dictionary is a natural language dictionary.

11. The finite state dictionary of claim 1, including program code implementing a plurality of different access processes, each of said formats being associated with a respective one of said plurality of access processes.

12. A method of producing a finite state dictionary for use in data processing, the method comprising the steps of:
providing nodes representing symbols stored in the dictionary;
providing links linking the nodes;
classifying each of the nodes as a start of chain node, heavy use node, middle use node, or light use node, wherein the node's classification is based on a probability of use of the node; and
associating with each node one of a plurality of predetermined formats selected in dependence on the node's classification, the plurality of formats being used to create formatted representations of the nodes and/or links, wherein a plurality of different formats are useable simultaneously to represent respective ones of said nodes and/or links in the dictionary,
wherein the format of the node in view of the node's classification assigns a searching strategy for accessing the symbols in the dictionary.

13. The method of claim 12, wherein the node's classification assigns the format based on the node's probability of use and an in-degree and an out-degree of the node, wherein the in-degree identifies a first number of in-flowing links and the out-degree identifies a second number of out-flowing links.

14. The method of claim 12, wherein the plurality of predetermined formats comprises a different format for at least two of:
start of chain nodes, comprising nodes having only one out-flowing link to another node having only one out-flowing link;
heavy use nodes, comprising nodes having more than a first predetermined number of out-flowing links;
middle use nodes, comprising nodes having a number of out-flowing links less than or equal to the first predetermined number and greater than a second predetermined number which is less than the first predetermined number; and
light use nodes, comprising nodes having more than one out-flowing link and which is not a heavy use node or a middle use node.

15. The method of claim 14, wherein the format for heavy use nodes comprises a transition table identifying links between symbols in the dictionary and an indexed array into the transition table for holding links out-flowing from the associated node, wherein the searching strategy associated with the format for heavy use nodes uses the index array to retrieve symbols from the dictionary, and the symbols are ordered by probability of use in the indexed array.

16. The method of claim 14, wherein the format for middle use nodes comprises an array holding links out-flowing from the associated node, wherein the searching strategy associated with the format of middle use nodes uses logarithmic indexing in a linked node list for finding the out-flowing link.

17. The method of claim 14, wherein the format for light use nodes comprises an array holding links out-flowing from the associated node, the links in the array being ordered according to their probability of use, wherein the searching strategy associated with the format of light use nodes uses linear indexing in a linked node list for finding the out-flowing link.

18. The method of claim 14, wherein the format for start of chain nodes comprises means for holding, if the associated node is linked to a sequence of more than two nodes each having only one out-flowing link, a pointer to the last node in the sequence and for holding the or each symbol associated with further nodes in the sequence as a letter chain comprising a string of characters, wherein during searching for a symbol in the dictionary, a transition is made to the start of chain nodes only when a substring from an input word matches the letter chain attributed to the link created by the pointer.

19. The method of claim 13, wherein the probability of use of the nodes is determined from a predetermined symbol probability analysis.

20. The method of claim 13, wherein the probability of use of the nodes is determined from a prior accumulation of statistics from use with corpora.

21. The method of claim 12, wherein the dictionary is a natural language dictionary.

22. The method of claim 12, including associating a respective one of a plurality of different access processes with each of said formats.

* * * * *